Jan. 19, 1954 H. A. ROBINSON ET AL 2,666,691
RECORDING TITRATION APPARATUS
Filed Oct. 13, 1948 5 Sheets-Sheet 1

INVENTORS
Harold A. Robinson
Rollin H. Briggs
By Carlson, Pitzner, Hubbard and Wolfe
ATTORNEYS

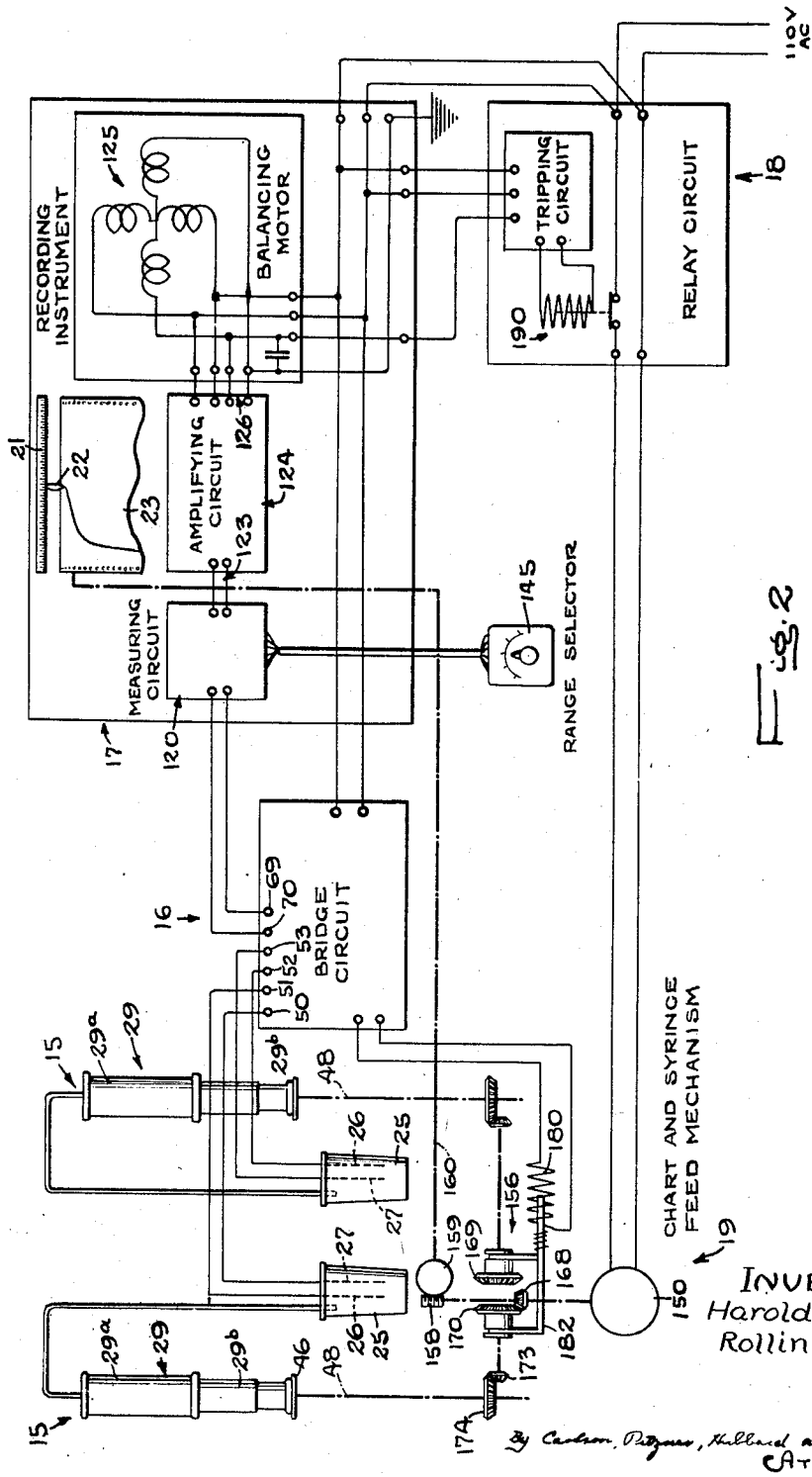

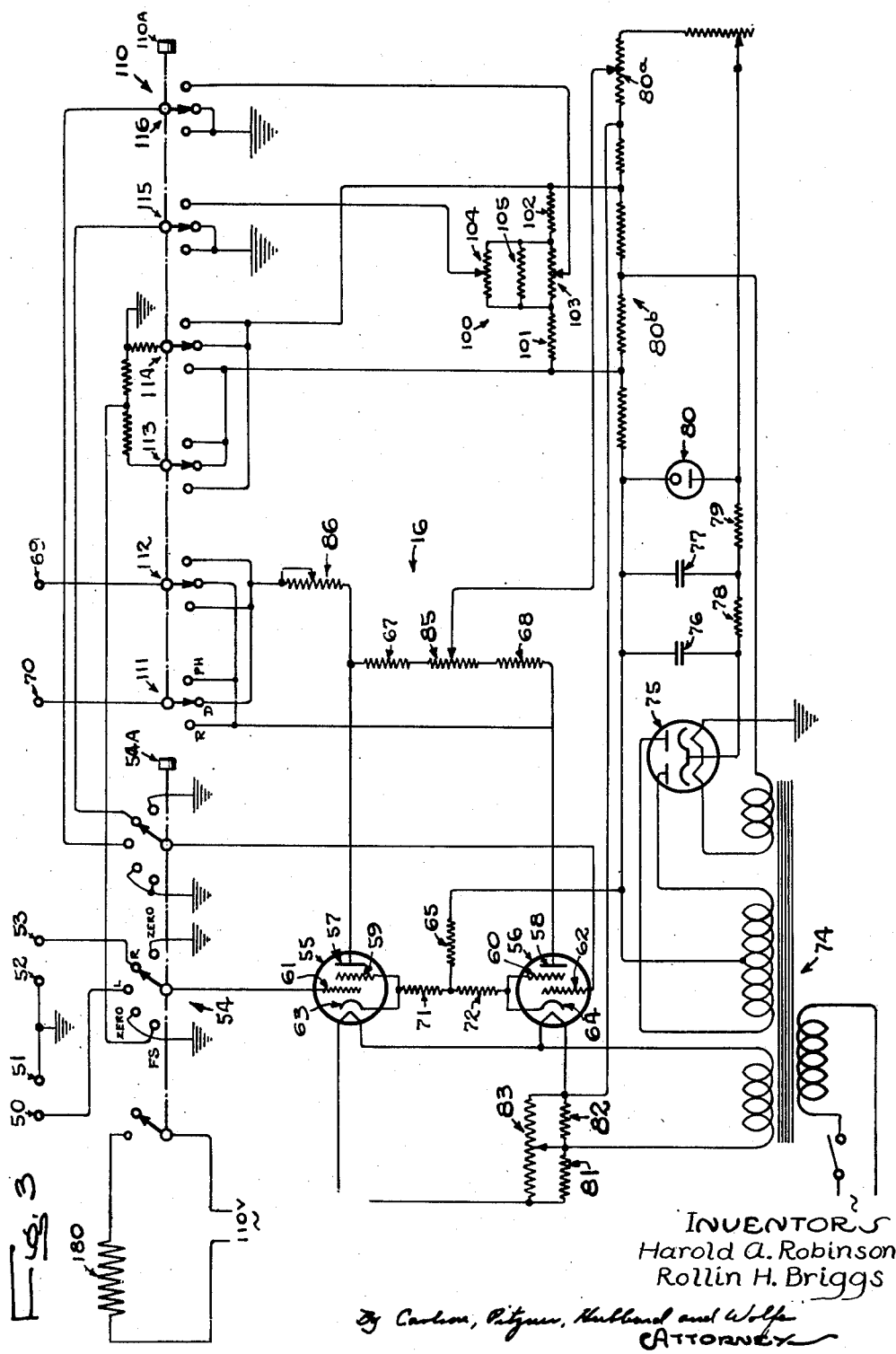

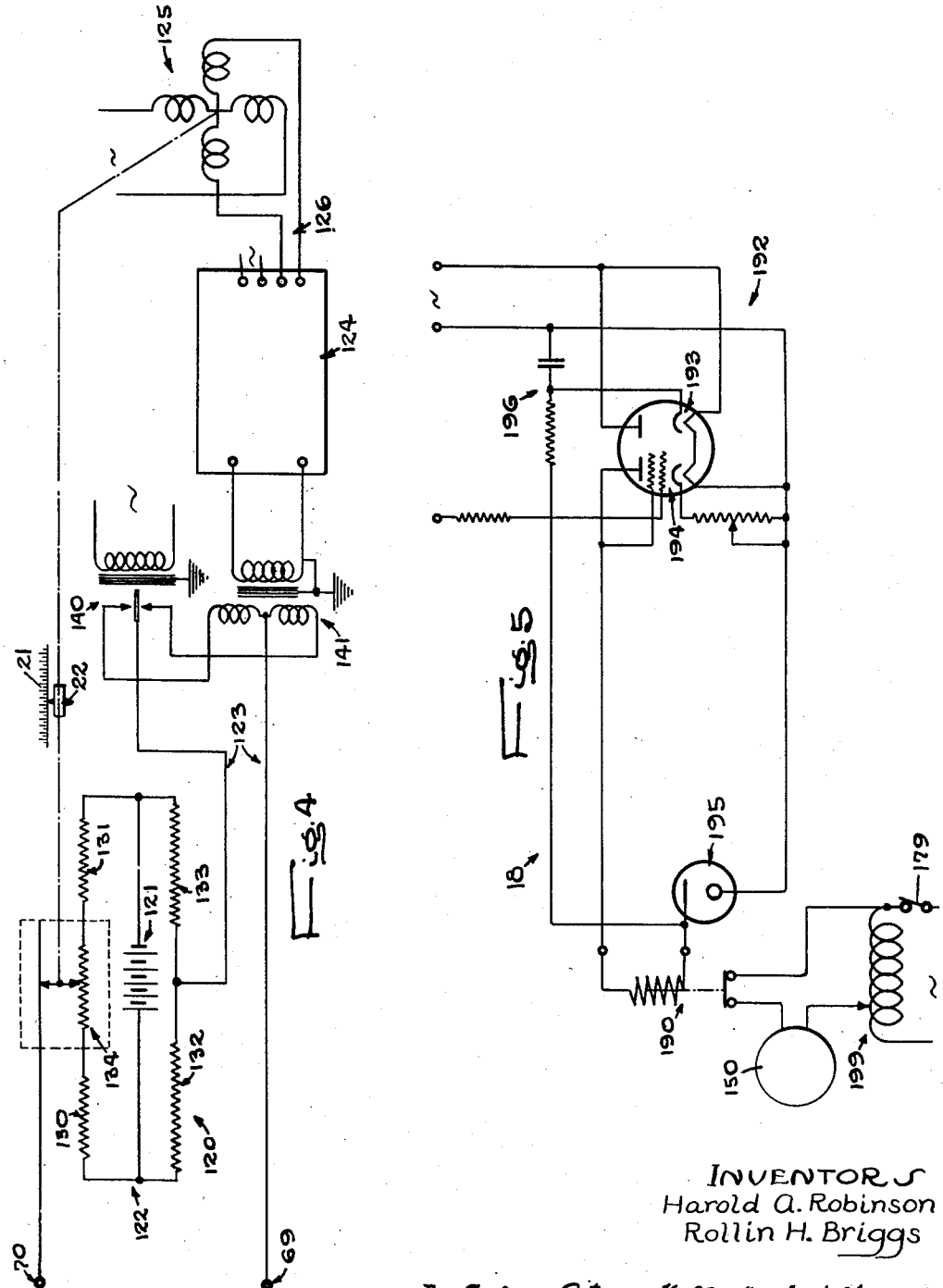

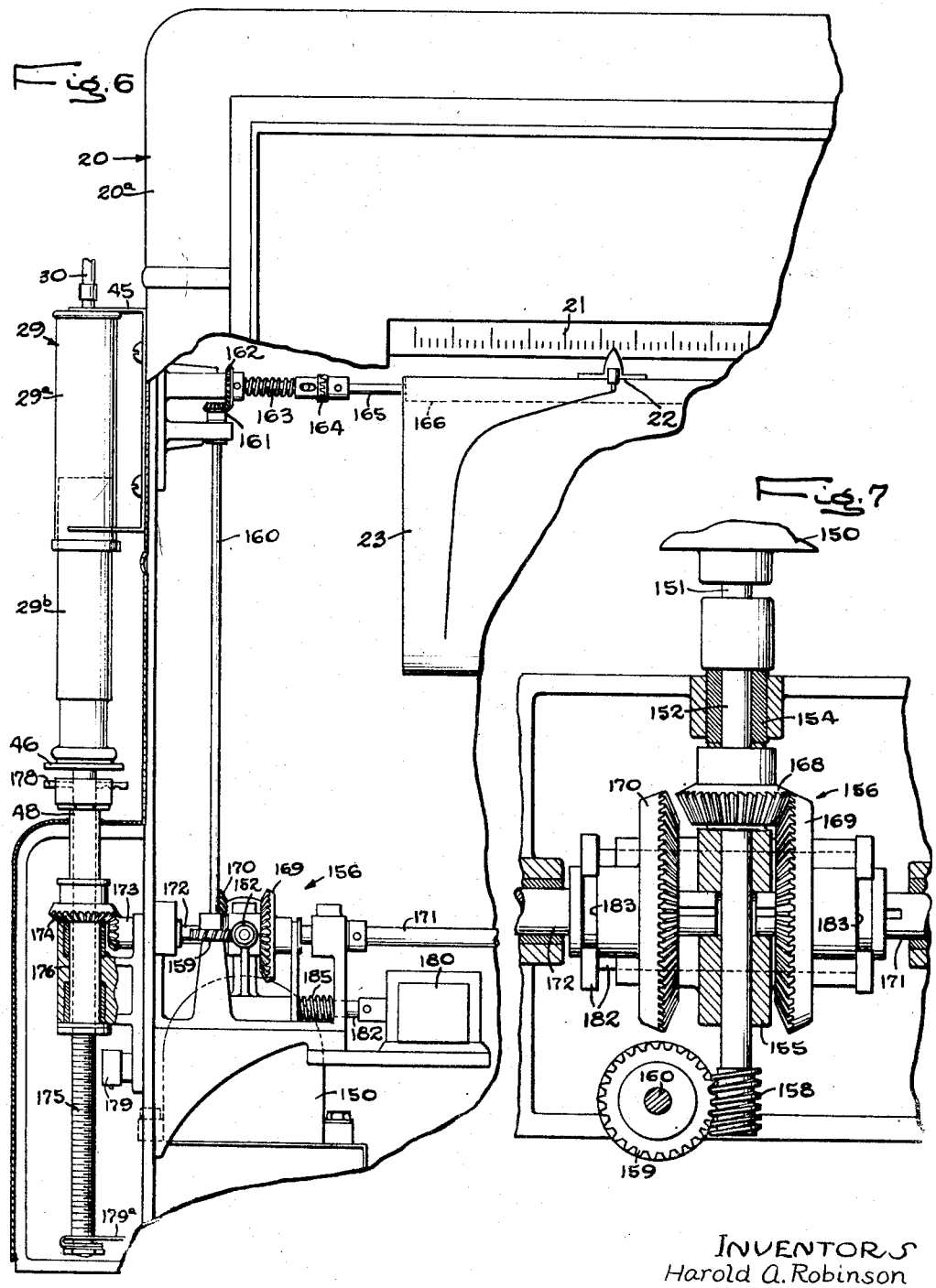

Patented Jan. 19, 1954

2,666,691

UNITED STATES PATENT OFFICE 2,666,691

RECORDING TITRATION APPARATUS

Harold A. Robinson and Rollin H. Briggs, Midland, Mich., assignors to The Dow Chemical Company, Midland, Mich., a company of Delaware Application October 13, 1948, Serial No. 54,304

3 Claims. (Cl. 23—253)

The present invention relates to devices for performing titrations.

It is an object of the invention to provide a novel apparatus for determining by electromotive force measurements the acidic or basic strength of solutions of unknown concentration, which is operative both to perform a titration and to record the electromotive force measurements directly in the form of a plot or titration curve.

Another object resides in the provision of titration apparatus which is effectual in its operation to automatically perform a titration and to simultaneously record a titration curve, novel means being provided to keep the recorder pen and titrator in step for the production of an accurate record.

It is a more specific object to provide an automatic titrator with provision for synchronizing movement of the recorder chart with the addition of reagent standard solution.

The objects of the invention thus generally set forth together with other and ancillary advantages are attained by the construction and arrangement shown by way of illustration in the accompanying drawings, in which:

Fig. 2 is a block diagram illustrating the general arrangement of the instant device.

Fig. 3 is a schematic circuit diagram of the bridge circuit.

Fig. 4 is a schematic circuit diagram of the recording instrument.

Fig. 5 is a schematic circuit diagram of the relay circuit.

Fig. 6 is a fragmentary elevation of the chart and syringe feed mechanism.

Fig. 7 is a fragmentary plan view of the chart and syringe feed mechanism.

Figure 1:
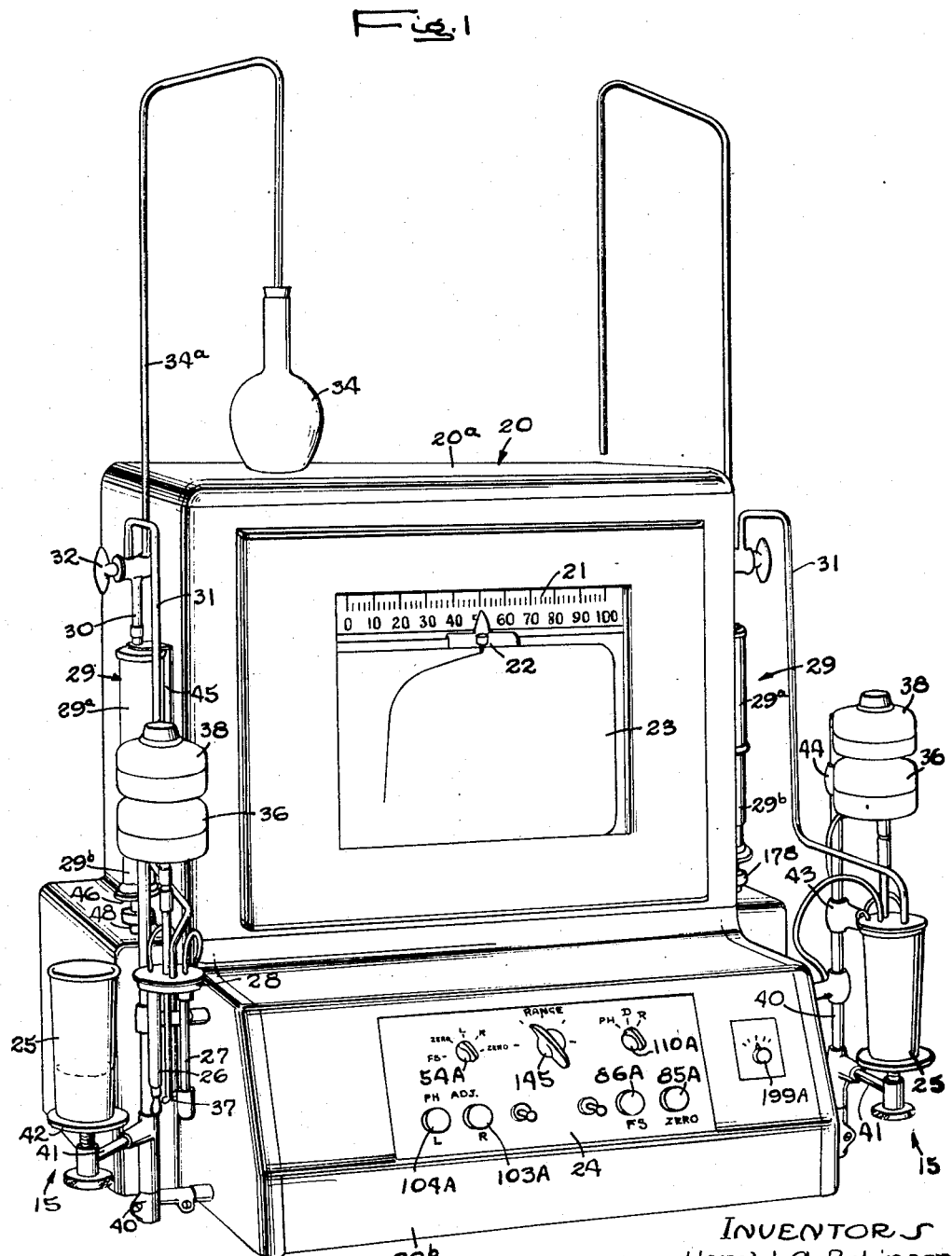
Figure 1 is a perspective view of a titration apparatus embodying the features of the present invention.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

A titration is a volumetric determination of the strength of an acid, base, or the like, and is performed by the addition of a solution from a graduated container to a known volume of a second solution until a neutralization reaction between the two is completed. Ordinarily, the added solution is one of known concentration or strength and thus constitutes a standard, and the second solution is the one of unknown strength. From a knowledge of the volume of solution added and its strength and the original volume of the solution of unknown strength, one can readily calculate the strength of the unknown solution. In other words, the purpose of any type titration is to determine what volume of one solution is equivalent to a certain volume of another solution, or to determine an equivalence point.

Some means must be utilized to notify the chemist performing the titration when the equivalence point is reached. Commonly, certain organic substances whose color changes at or near equivalence point are used. However, such indicators do not always change color at the same point, and further in titrations of solutions which are themselves colored or are turbid, ordinary color indicators are useless. Such titrations may be accomplished by means of electromotive force measurements in a chemical cell involving the solution of unknown strength, since near the equivalence point in a titration the hydrogen ion concentration changes rapidly, and correspondingly, there is a rapid change in electromotive force output from the cell. Thus, a plot of the electromotive force against the volume of standard solution added, which is known as a titration curve, will show the point where the hydrogen ion concentration changes most rapidly, such point being the equivalence point.

To obtain electromotive force readings for plotting, two electrodes one of which may be a neutral or glass electrode and the other a calomel electrode, are suspended in a known volume of the solution of unknown strength and to which a standard solution is slowly added, the volume thereof being measured. These electrodes are connected to some form of electromotive force indicating instrument such, for example, as a galvanometer. The change in E. M. F., or voltage, between the electrodes as indicated by the measuring instrument during the titration is exactly equal to the change of potential of the neutral indicator electrode. A calomel electrode is preferred for the other half of the chemical cell because it is a definite standard and is reproducable in any laboratory without any assumption regarding ionization. It is rugged, changes little, is convenient to handle and has a substantially constant potential.

In determining the titration curve, the volume of standard solution added may be plotted against the E. M. F. output of the chemical cell either expressed in volts or in pH units. A pH unit is defined as the logarithm of the reciprocal of the hydrogen ion concentration, and one pH unit corresponds to a change of approximately .059 volt. A neutral solution has a pH value of 7.

The present invention comprises means for determining the acidic or basic strength of a solution of unknown concentration from E. M. F. determinations by automatically performing a titration and simultaneously recording E. M. F. output from a chemical cell as the titration is carried out. More specifically, the novel apparatus includes a chemical cell embodying titration electrodes, a recording instrument, a feed mechanism and control circuits constructed and arranged to coordinate the addition of standard solution from a graduated container to a measured volume of the solution of unknown strength and the recording of the resulting E. M. F. changes so that a smooth, accurate and directly usable titration curve is produced from which the strength of the solution of unknown concentration can be readily determined.

For purposes of ready understanding, the invention can be broken down into five portions as disclosed in Fig. 2, which, although cooperating with one another to produce a novel and improved result, may nevertheless be separately considered. The first of these portions is what may be termed the titration assemblage and includes the chemical cell and its electrodes. It is designated generally by the numeral 15. The second portion of the device which is directly connected to the titration electrodes may be termed a bridge circuit and is designated generally by the numeral 16. The third portion comprises the recording instrument and is denoted by the numeral 17. The fourth portion of the device which is generally designated 18 may be termed a relay circuit. And the fifth portion comprises the feed mechanism which serves both to advance the chart in the recording instrument and to control the addition of standard solution. This fifth portion is denoted by the numeral 19.

Referring now to the drawings and to Figure 1 in particular, the exemplary form of the invention illustrated includes a main housing 20 having upper and lower sections 20a and 20b and disposed within which are the recording instrument 17, which includes a scale 21, a pointer and pen 22, a chart 23, and the other component portions of the instant device. On the front face of the lower housing section 20a is a control panel 24 for the device, and upon which are centralized the controls for component circuit elements.

*Titration assemblage*

Disposed adjacent the sides of the housing 20 are the titration assemblages 15. Two assemblages are provided which are independent of each other so that while one is being used in performing a titration the other can be prepared for the performance of another titration, thereby facilitating the running of a series of titrations. Each titration assemblage 15 includes a chemical cell setup comprising a beaker 25 in which the solution of unknown strength is placed, a calomel electrode 26 and a neutral indicator, or glass, electrode 27, both supported on a beaker cover 28, and a syringe 29 serving as a graduated container for the standard solution. Standard solution is supplied from the syringe into the beaker 25 by way of tubing 30 and 31 and a cock 32. Disposed atop the housing 20 is a flask 34 for reagent standard solution and the syringe 29 may be filled from it by way of a tube 34a, the cock 32 and the tube 30.

To insure thorough mixing of the two solutions as the titration is performed each assemblage is provided with a stirring motor 36 for driving an agitator 37, the latter being disposed between the electrodes 26 and 27. Each motor 36 has a potentiometer 38 thereon whereby its speed can be controlled.

To support the stirring motor 36 and the chemical cell setup a stand 40 is provided which is rigidly secured to the housing 20. Adjacent the lower end of the stand and projecting laterally therefrom is a swingable arm 41 supporting on its end an adjustable platform 42 upon which the beaker 25 is placed. The beaker cover 28 together with the electrodes 26 and 27 supported therein is supported on a second arm 43 disposed intermediate the ends of the stand 40. The stirring motor 36 and its potentiometer 38 are attached to the stand by means of a third arm 44 disposed adjacent the top of the stand 40.

The syringe 29 comprises two portions, a cylindrical body portion 29a and a plunger or piston portion 29b. The body portion 29a of the syringe is supported in a U-shaped spring clamp 45 secured directly to the side of the upper housing section 20a. The syringe plunger 29b is supported on a platform 46 which, in turn, is positioned atop a feed screw 48 for movement into and out of the cylindrical syringe body 29a.

*Bridge circuit*

The bridge circuit 16 (Fig. 3) is provided to detect and adapt E. M. F. output of the chemical cells of the titration assemblages 15 for application to the recording instrument 17. It comprises basically a push-pull, direct current amplifier having negative feedback for stabilization. The titration electrodes 26 and 27 of each chemical cell are directly connected to pairs of input terminals 50, 51 and 52, 53 respectively, for the left and right titration assemblages 15, and a selector switch 54 is provided to alternatively connect these pairs of terminals to the bridge circuit.

Turning now to a detailed consideration of the circuit, two of its arms comprise a pair of identical vacuum tubes 55 and 56. As shown, each of the vacuum tubes has four elements, plates 57 and 58; screen grids 59 and 60; control grids 61 and 62; and cathodes 63 and 64, respectively, the screen grids and the cathodes of each being tied together. Vacuum tubes of the type known as "type 38" have proven satisfactory. These tubes are operated at an extremely low plate voltage and with a filament voltage considerably lower than the rated value of the tube. This produces day to day uniformity of operation as well as long life.

By means of the switch 54 the E. M. F. output from the chemical cells is alternatively applied to the control grid 61 of the tube 55. The switch 54 actually connects either of the terminals 50 or 53, to which the indicator electrodes 27 are connected, to the control grid 61, since, as hereinbefore set forth, the change in E. M. F. during titration is exactly equal to the change of potential of the indicator electrode. Thus, the terminals 51 and 52 to which the calomel electrodes 26 are connected are grounded. For reference purposes, the control grid 62 of the tube 56 is grounded simultaneously with the application of chemical cell output to the grid of the tube 55 by means of the switch 54.

The vacuum tubes 55 and 56 are linked together by a common resistor 65 in their cathode circuits. Because of this coupling, any change in the input voltage to the grid 61 of the tube 55 changes the cathode bias of the tube 56. As a result, the change in the plate current of the tube 55 is accompanied by a simultaneous change in the plate current of the other tube 56 but in the opposite direction. Thus a differential voltage is developed across plate load resistors 67 and 68 which comprise the other two arms of the bridge and appears at the output terminals 69 and 70 of the bridge for application to the recording instrument 17.

Sensitivity and negative feedback for stabilization are controlled by resistors 71 and 72 inserted between the common cathode resistor 65 and cathodes 63 and 64 of the vacuum tubes 55 and 56, respectively. It is particularly important in the titration of solutions of extremely low acidic or basic strength that the device have high sensitivity. Using type 38 vacuum tubes operating at a plate voltage of 17.5 volts and with a filament voltage of 3.8 volts, it has been found that the requisite sensitivity is attained with resistance values of 7,000 ohms for the resistors 71 and 72 with approximately 50,000 ohms for the resistor 65.

As shown, the power supply for the bridge circuit includes a transformer 74 whose secondary supplies proper filament voltages and a voltage for application to a full wave rectifier circuit. The rectifier circuit includes a double diode vacuum tube 75, a filter network which comprises a pair of capacitors 76 and 77 and a pair of resistors 78 and 79, and a voltage regulator tube 80 whereby a constant output voltage is applied across an ordinary voltage divider network 80b. The voltage divider network 80b includes a potentiometer 80a from which the plate voltage for both of the vacuum tubes 55 and 56 in the bridge is tapped off.

While the pair of tubes 55 and 56 are chosen to be of as nearly identical operating characteristics as possible, as a practical matter such identity is rarely found. Thus provision is made to compensate for any differences. To this end a voltage divider network comprising fixed resistors 81 and 82 and a variable potentiometer 83 are provided in the filament circuits of the tubes 55 and 56.

To compensate for variation of circuit operating conditions so that a zero reading of the recording instrument 17 obtains with no input to the grids 61 and 62, an adjustable plate load resistor 85 is provided a portion of which is in series with the plate load resistor 67 and the other portion of which is in series with the plate load resistor 68. To make this zero adjustment the switch 54 is moved to zero position which grounds the grids 61 and 62 of the vacuum tubes 55 and 56. The arm of the adjustable plate load resistor 85 is then moved until the plate voltage on both of the tubes 55 and 56 is equal. When such condition obtains there will be no output between the bridge output terminals 69 and 70 and thus the recording instrument 17 will read zero. This adjustment, as with any instrument of this general type, must be made frequently and thus it is made a front panel adjustment controllable by a knob 85A on the control panel 24.

Similarly, a full scale adjustment is provided so that the output from the bridge circuit can be indicated over the entire range of the recording instrument. To this end a variable resistor 86 whose movable arm constitutes a shunt is inserted in series with either the output terminal 69 or 70 of the bridge circuit, the shunt permitting of insertion of any portion of the resistor 86 in series with the output of the bridge. This is also a front panel adjustment and is controlled by a knob 86A on the control panel 24. When making such adjustment the switch 54 is operated to "F. S.," or full scale position. Upon reference to Fig. 3 it will be seen that this grounds the grid 62 of the vacuum tube 56 and applies a reference voltage to the grid 61 of the vacuum tube 55. This reference is obtained from the voltage divider network 80b and is on the order of one volt.

Ordinarily in the performance of titrations by E. M. F. determinations the chemist is not particularly interested in the actual value of the E. M. F. output of the chemical cell, but rather he wants to know the change in output therefrom upon addition of standard solution to the solution of unknown concentration. For certain classes of work, however, the chemist might desire exact pH values, particularly when he desires to compare the acidic or basic strengths of more than one sample. The provision of two titration assemblages in the instant device permits of such comparison. However, for that comparison to be accurate the output of the two chemical cells must be correlated, and as a practical matter, there is some variation between calomel electrodes. So that a titration curve produced using one cell exactly corresponds to that produced using the other cell, provision is made to compensate for calomel electrode variation in order to permit performance of comparison titrations by merely switching between the two assemblages 15 without necessity of application of some correction factor to the resulting curves before a comparison thereof can be made. To this end, instead of grounding the grid 62 of the tube 56, a small reference voltage is applied by way of the switch 54 which is of a magnitude to compensate for differences of chemical cell output caused by calomel electrode variation. Thus, a balancing resistor network 100 is provided by means of which the proper compensating voltage can be applied to the grid 62. This balancing network comprises a pair of resistors 101 and 102 between which are a pair of potentiometers 103 and 104 connected in parallel and in parallel with an intermediate fixed resistor 105. The movable arms of the potentiometers 103 and 104, which are independently adjustable, permit tapping off of reference voltages for application to the grid 62, the potentiometer 103 supplying the compensating voltage for application to the grid 62 when using the right titration assemblage and the potentiometer 104 for supplying the compensating voltage to the grid 62 when using the left titration assemblage. The range of adjustment of these potentiometers is sufficient to permit application of reference voltages to compensate for a variation between chemical cell outputs of 1 pH for either cell in either direction. These adjustments are controlled by knobs 103A and 104A on the control panel 24.

When the solution of unknown concentration is acidic, with a standard solution which is basic being added, the hydrogen ion concentration in the cell decreases and the E. M. F. output of the cell increases. When the solution of unknown concentration is basic with a standard solution which is acidic being added, the hydrogen ion concentration in the cell increases and the E. M. F. output of the cell decreases.

In the instance device the addition of standard solution is coordinated with the recording of E. M. F. output of the cell and the ordinates of the resulting plot correspond to the volume of standard solution added. The abscissae correspond to the E. M. F. output. Thus the ordinates are always of increasing value and in the case of a titration of an acid of unknown concentration with a standard base the abscissae increase as well. Thus a curve beginning on the left and ascending toward the right is obtained. But in the case of a titration of an unknown base with a standard acid the E. M. F. output of the cell decreases, in which case a curve beginning on the right and ascending toward the left is obtained. For the second case therefore the indication of the scale in the instrument may be considered as "flopped over." The foregoing is accomplished in the instant device through the provision of a multiple stage switch 110 in the bridge circuit which has an operator knob 110A on the control panel 24. As shown, the switch has six stages 111–116 inclusive the first two of which namely, stages 111 and 112 being effective to reverse the connections between the output terminals 69 and 70 of the bridge circuit 16 and the input terminals of the recording instrument 17. These positions of the switch 110 are denoted on the control panel 24 by "D," providing connection to produce a curve whose abscissae begin at the left and increase toward the right, and "R" for the reverse of the former connection. The stages 115 and 116 having corresponding "R" and "D" positions are both operative to connect the grid 62 of the tube 56 to ground, by way of the switch 54 for either the left or right positions of the latter. The stages 113 and 114 permit of application of a reference voltage, on the order of one volt in the present instance to the grid 61 of the vacuum tube 55 so that a full scale deflection of the recording instrument is attainable in either of the "R" or "D" settings of the switch 110.

Recording instrument

The recording instrument, a simplified diagram of which is shown in Figs. 2 and 4, comprises means to indicate and record the output E. M. F. of the bridge circuit 16 which is impressed upon it by maintaining a balance between the impressed E. M. F. and a self-contained E. M. F. source. It comprises a measuring circuit 120, which includes a source of E. M. F. such as a battery 121 and a resistance network designated generally 122, an amplifying circuit 124 and a balancing motor 125 which are correlated to restore a balanced condition upon a change of impressed E. M. F. With a certain E. M. F. impressed and the resistance network 122 set to apply an equal but opposite E. M. F. from the battery 121 to balance it out, any change of E. M. F. impressed produces a condition of unbalance. This unbalance, appearing as a signal voltage between leads 123, is applied by way of the amplifying circuit 124 to the balancing motor 125 producing a rotation thereof in a direction determined by the direction of the unbalance. A mechanical connection between the balancing motor and an element of the resistance network 122 causes the effective resistance of the latter to be changed in follow-up action until a balance between the impressed E. M. F. and that from the cell 121 is restored.

The resistance network 122 includes fixed resistors 130, 131, 132 and 133, and interposed between the resistors 130 and 131 is a slide wire unit 134 to which one of the output terminals 69 or 70 of the bridge circuit 16 is connected. The other bridge circuit terminal is unaffected by the resistance network. The output of the measuring circuit appearing between the conductors 123 is applied to the amplifying circuit by way of a converter 140 and an input transformer 141. The converter is merely a vibratory double-throw switch having a vibrator excited by the same A. C. line that supplies one winding of the motor 125 and applies the output from the measuring circuit alternately to each of two halves of the primary winding of the input transformer 141 thus inducing an A. C. voltage in the secondary winding of the transformer. This A. C. voltage is amplified by the amplifying circuit 124 and supplies the controlling power to the balancing motor 125 by way of a lead 126.

The balancing motor 125 is a brushless, reversible variable speed induction motor which recognizes the phase of the driving power. One of the motor windings is continuously energized by the line voltage. The other winding is energized by the output from the amplifying circuit 124, with a current whose phase with respect to the line current determines the direction of rotation of the motor. Since the phase of the current of the output of the amplifier circuit 124 is directly determined by the direction of unbalance of the measuring circuit 120 the balancing motor pinion rotates in a direction determined by the unbalance. The contactor of the slide wire unit 134 in the measuring circuit 120 is mechanically connected to the motor pinion. Thus as the motor rotates, the contactor is moved altering the resistance of the measuring circuit resistance network 122 until a condition of balance between E. M. F. impressed and that from the battery 121 is restored, whereupon rotation of the balance motor ceases. With this system there is substantially no time delay between the actual unbalance and the beginning of the corrective action to restore a balanced condition. The pen and pointer 22 are also mechanically connected to the balancing motor pinion and thus it is moved simultaneously with movement of the contactor of the slide wire unit 134, and the amount of its movement is directly proportioned to the amount of impressed E. M. F.

It will be obvious to one skilled in the art that the range of measurement of the recording instrument 17 may be varied by substituting different values for the fixed resistors 130, 131, and 132 in the measuring circuit resistance network 122. While the actual resistor substitution arrangement is not shown in the drawings, any desired provision can be made under the control of a range selector switch 145 to change the values of each of these resistors. The switch 145 is disposed centrally of the control panel 24.

Chart and syringe feed mechanism

An important feature of the present invention resides in the means illustrated in Figs. 6 and 7 to simultaneously advance the chart of the recording instrument 17 and add standard solution from the syringe 29 of the titration assemblage 15. Stated generally, this means comprises a feed motor 150 together with suitable shafts, gearing and feed screws, the operation of which is controlled by the relay circuit 18 and coordinated with the operation of the recording instrument 17 so that addition of standard solution takes place only when a balanced condition in the recording instrument obtains.

The motor 150 has included within its housing a speed reduction gear system (not shown) from which a drive shaft 151 extends and the outer end of which is coupled to a transverse shaft 152. The latter is journaled in bearings 154 and 155 in a gear shift assembly, designated generally 156. Considering first the chart drive, on the end of the transverse shaft 152 opposite the motor 150 is fashioned a worm 158, which is in continuous engagement with a worm gear 159, which, in turn, is fast on a vertical shaft 160. The upper end of the vertical shaft 160 supports a bevel gear 161 which is in continuous engagement with a driven bevel gear 162 supported adjacent the end of a stub shaft 163. The stub shaft 163 is drivingly connected, by means of a spring biased, toothed coupling 164, to a horizontal shaft 165 upon which is mounted a roll 166 for the chart 23.

The gear shift assembly 156 permits alternative feeding of the syringes 29 of the two titration assemblages 15 simultaneously with the advance of the chart 23. To this end, the assembly 156 includes a bevel gear 168 supported intermediate the ends of the transverse shaft 152, together with a pair of bevel gears 169 and 170 splined to coaxially aligned shafts 171 and 172, respectively, to rotate the same, the gears 169 and 170 being shiftable axially of the shafts 171 and 172 into and out of engagement with the driving gear 168. The outer ends of the shafts 171 and 172 support bevel gears 173 which mesh with bevel gears 174 supported on the feed screws 48.

Each of the syringe feed screws 48 is of telescoping construction comprising inner and outer threaded elements 175 and 176. The bevel gear 174 is rigidly secured on the outer threaded element 176 and thus causes it to rotate. Fixed to the upper end of the element 176 is a disengageable nut 178. The inner threaded element passes through the nut 178, and when the nut is engaged the inner element 175 is fed upwardly through it. Thus, the syringe plunger 29b is forced upwardly into the cylindrical body 29a of the syringe and thereby forces solution from it.

When it is desired to refill the syringe simultaneously with the lowering of the feed screw, the nut 178 is disengaged releasing the inner feed screw element 175. The syringe plunger 29b is loaded with lead shot or the like to give it considerable weight. Thus, upon release of the nut 178 its weight will force it downwardly and cause the inner feed screw element 175 to be pushed downwardly at the same time. Prior to releasing the disengageable nut, the cock 32 is operated to connect the syringe 29 to the reagent flask 34 atop the housing 20. Thus, as the plunger moves downwardly, reagent solution is drawn into the syringe.

To limit upward movement of the feed screw, a limit switch 179 is provided which is actuated by an operator 179a fixed adjacent the lower end of the inner feed screw element 175. This switch is in series with the line supplying power to operate the feed motor 150 and when it is actuated upon contact by the operator 179a it interrupts further feed.

A solenoid 180 is utilized to produce shifting of the gear assembly 156, that is to say, to alternatively bring the bevel gears 169 and 170 into and out of mesh with the driving bevel gear 168. To this end, the solenoid is coupled to a yoke 182 which is laterally shiftable in the assembly 156. The arms of the yoke 182 are forked and are received in peripheral grooves 183 in the hub portions of the bevel gears 169 and 170. Upon energization of the solenoid 180, the yoke 182 is shifted toward the right as viewed in Figs. 6 and 7 and the bevel gear 170 is brought into engagement with the driving bevel gear 168 whereupon the left titration assemblage is operated. When the solenoid 180 is de-energized a spiral spring 185 supported between the yoke 182 and the frame of the assembly 156 which was compressed upon energization of the solenoid becomes operative to shift the assembly 156 so that the bevel gear 169 is brought into engagement with the driving bevel gear 168 whereupon the titration assemblage on the right side of the instant apparatus is made operative.

Upon reference to Fig. 3, it will be seen that the solenoid 180 is actuated by line voltage and the switch controlling its energization is mechanically connected to the switch 54 and controlled by the knob 54A on the control panel 24.

*Relay circuit*

The operation of the chart and syringe feed mechanism is controlled by the relay circuit 18 which, in turn, is controlled by the operation of the recording instrument 17. The relay circuit 18 includes a normally closed relay 190 and a tripping circuit 192 therefor constructed and arranged so that the feed motor 150 is de-energized as long as any voltage unbalance exists and as long as there is any movement of the balancing motor 125 and its associated points 22. However when balance is achieved and the motor 125 comes to rest, the motor 150 is actuated to continue the addition of standard solution to the solution of unknown concentration and advance the chart 23.

The tripping circuit 192 comprises a pair of vacuum tubes 193 and 194 both of which may be included in the same envelope. The vacuum tube 193 comprises simply a diode rectifier which, in combination, with a voltage regulator tube 195 and a filter network 196 supplies power for the tube 194.

The circuit for the tube 194 is constructed so that the tube 194 is normally non-conducting. When an unbalance of the recording instrument is produced, a signal voltage is applied to the control grid of the tube 194 directly from the same lead 126 from the amplifying circuit 124 in the recording instrument 17 that energizes the control winding of the balancing motor 125. This signal causes the tube 194 to become conducting. The output from the tube 194 is fed to the relay 190 to energize the same, whereupon it operates to interrupt the line supply voltage to the motor 150 thus stopping it and preventing further addition of standard solution and advance of the chart 23. A brake (not shown) may be used to prevent the motor from overrunning and causing additional standard solution to be added. When a balanced condition is restored in the recording instrument 17 and there accordingly is no signal voltage applied to the control grid of the tube 194, the tube again become non-conducting permitting the relay 190 to close whereupon the motor 150 is again actuated to continue the addition of standard solution and the advance of the chart 23.

Provision is made to vary the speed of the motor 150 to control the rate of addition of standard solution. To this end the supply voltage to the motor is controlled by means of a variable transformer 199 which may be of the familiar type known as a variac. The operation of this transformer is made a front panel adjustment and is controlled by a knob 199A disposed adjacent the control panel 24.

*Operation*

While the operation of the instant device will be clear from the foregoing to one skilled in the art, it will be helpful to review it briefly. Assuming identity of operating conditions of the balanced circuit components and that a sufficient warm-up period has been allowed, the first step is to apply a standard potential to the control grids 61 and 62 of the tubes 55 and 56 in the bridge circuit 16 to make a full scale adjustment. This is done by turning the switch 54 to the "F. S." position and then adjusting the potentiometer 86 so that the pointer 22 of the recording instrument 17 reaches a suitable upper scale limit.

Having thus established a full scale adjustment, the switch 54 is moved to zero position whereupon the control grids of both the bridge tubes 55 and 56 are grounded so that there will be no output from the bridge circuit 16. The zero control potentiometer 85 is then moved to balance the plate voltage applied across the bridge arms. When a balance is attained the pointer 22 of the recording instrument 17 indicates a zero scale reading. Since the zero and full scale adjustments are interrelated it will be necessary to repeat the foregoing steps until absolute adjustment obtains, two or three times usually being sufficient.

Now assume that the right titration assemblage 15 of the device has been prepared to perform a titration. This entails filling the syringe 29 with standard solution and placing the beaker 25 containing a known quantity of the solution of unknown concentration in position with the electrodes 26 and 27 placed therein. The next step is to operate the switch 54 of the bridge circuits 16 to "R" position thereby applying the E. M. F. output of the chemical cell of the right titration assemblage 15 to the grid of the tube 55 and correspondingly grounding the grid of the tube 56.

With the bridge circuit thus set up, the feed motor 150 is started so that standard solution from the syringe 29 is added to the solution of unknown concentration in the beaker 25 and the chart 23 of the recording instrument 17 is correspondingly advanced. It should be immediately observed whether the pointer tends to move in the proper direction as hereinbefore noted. Should the pointer tend to go in the wrong direction, the feed should be stopped and the switch 110 moved from either "R" to "D" positions or vice versa as the case may be.

Having again started the feed motor 150 to proceed with the titration, standard solution is added drop by drop to the solution of unknown concentration. The E. M. F. output of the chemical cell accordingly changes, is detected by the bridge circuit 16 and is impressed on the recording instrument 17 producing an unbalance of the measuring circuit 120 thereof. This automatically results in the operation of the balancing motor 125 to restore a balanced condition and in stopping the feed motor 150 simultaneously. While the balancing motor 125 begins to operate, moving both the pointer and the contactor of the slide wire unit 134 in the measuring circuit, the feed motor 150 which drives both the syringe and the chart is stopped by the action of the relay circuit 18. When a balanced condition of the measuring circuit 120 is attained, the chart and syringe motor starts up as permitted by the action of the relay circuit and thus more standard solution is added. This is a continuous process completely under the control of the device itself and requires no attention from an operator until the curve recorded on the chart 23 is complete. Actually, the steps, addition of standard solution, production of unbalance, interruption of the addition of standard solution and advance of the chart, restoration of balance, and resumption of addition of standard solution and advance of the chart, are so minute that a smooth curve is produced which is directly usable since there is substantially no time delay between the actual unbalance and the beginning of action to restore a balanced condition. The curve is exceedingly accurate because the condition of balance must be attained before a single drop of standard solution is added with a corresponding amount of chart movement.

While the apparatus is performing the titration utilizing the titration assemblage 15 on the right side thereof, the operator is free to prepare the left titration assemblage. Upon so doing, and upon completion of the right titration, the switch 54 in the bridge circuit is moved to "L" position and the foregoing sequence is followed for this titration just as was the case for the titration using the right titration assemblage.

When it is desired to perform a series of comparison titrations and more particularly when results plotted in pH values against quantity of standard solution added are desired, the necessary correlation between the two chemical cells of the titration assemblages can be attained (to compensate for variation between the calomel electrodes 26) by operating the switch 110 to "pH" position and making the necessary adjustments of the potentiometers 103 and 104 with no input to the grid 61 of the tube 55. This adjustment having been made, the titrations proceed just as before following the same sequence and the resulting curves can be used directly without necessity of application of any correction factor to compensate for chemical cell differences.

From the foregoing, therefore, it can be seen that a titration apparatus constructed in accordance with the present invention is effective to accurately and automatically perform a titration and simultaneously plot a titration curve as determined by the E. M. F. output from a chemical cell involving a solution of unknown concentration. The resulting curve is smooth and directly usable not only for determining the equivalence point in a single titration but are also directly usable for comparison of titrations of several sample solutions of unknown concentration without the necessity for the use of any correction factor.

We claim as our invention:

1. In a recording titration device provided with a chemical cell adapted to contain a quantity of test specimen having electrodes positioned therein between which the E. M. F. of the cell is produced, supply means for introducing standard solution into said cell, and recording means provided with a movable chart and recording stylus comprising in combination, a normally balanced electrical network, means for impressing the cells E. M. F. upon said normally balanced network to produce therein a condition of voltage unbalance, a first driving means for moving said recording stylus and for simultaneously rebalancing said electrical network, a second driving means for simultaneously feeding standard solution from said supply means into said chemical cell and for advancing said movable chart, and a control circuit rendered operative in response to the voltage unbalance of said network for disabling the operation of said second driving means during operation of said first driving means.

2. In a recording titration device provided with a chemical cell adapted to contain a quantity of test specimen having electrodes positioned therein between which the E. M. F. of the cell is produced, supply means for introducing standard solution into said cell, and recording means provided with a movable chart and recording stylus comprising in combination, a measuring circuit upon which the cell's E. M. F. is impressed comprising a variable resistance network and a self-contained source of E. M. F. which serve to detect an unbalance E. M. F. between the cell's E. M. F. and the self-contained source of E. M. F., a first driving means for moving said recording stylus and for simultaneously adjusting said variable resistance network to balance the cell's E. M. F. and the self-contained source of E. M. F., a second driving means for simultaneously feeding standard solution from said supply means into said chemical cell and for advancing said movable chart, and a control circuit responsive to said unbalance E. M. F. for selectively disabling the operation of one of said driving means during operation of said other driving means.

3. In a recording titration device provided with a chemical cell adapted to contain a quantity of test specimen having electrodes positioned therein between which the E. M. F. of the cell is produced, supply means for introducing standard solution into said cell, and recording means provided with a movable chart and recording stylus comprising in combination, circuit means upon which the cell's E. M. F. is impressed comprising a variable resistance network and a self-contained source of E. M. F. which serve to detect an unbalance E. M. F. between the cell's E. M. F. and the self-contained source of E. M. F., a motor connected to move said recording stylus and simultaneously to adjust said variable resistance network to balance the cell's E. M. F. and the self-contained source of E. M. F., an energizing circuit for said motor controlled by the unbalance E. M. F. detected by the said circuit means, a drive for simultaneously feeding standard solution from said supply means into said chemical cell and for advancing said movable chart, and a circuit energized in response to said unbalance E. M. F. for interrupting the operation of said drive when said motor is energized to move said recording stylus and simultaneously to adjust said variable resistance network.

HAROLD A. ROBINSON.
ROLLIN H. BRIGGS.

References Cited in the file of this patent

UNITED STATES PATENTS

| Number | Name | Date |
|---|---|---|
| 1,530,833 | Keeler | Mar. 24, 1925 |
| 1,684,645 | Smith et al. | Sept. 18, 1928 |
| 2,376,311 | Hood | May 15, 1945 |
| 2,392,916 | Gruss | Jan. 15, 1946 |
| 2,396,934 | Wallace | Mar. 19, 1946 |
| 2,400,828 | Keinath | May 21, 1946 |
| 2,423,480 | Caldwell | July 8, 1947 |
| 2,452,587 | McCoy | Nov. 2, 1948 |
| 2,464,708 | Moseley | Mar. 15, 1949 |

FOREIGN PATENTS

| Number | Country | Date |
|---|---|---|
| 715,397 | Germany | Dec. 20, 1941 |

OTHER REFERENCES

Canadian Chemistry and Metallurgy, September 1931, Automatic Controls in the Chemical Industry (pages 239, 240, 245 and 246).

Lingane, "Ind. and Eng. Chem. Anal. Ed.," vol. 20, April 1948, pages 285–292.

Kolthoff and Furman, "Potentiometric Titrations," 2nd Ed., pages 112–143. John Wiley and Sons, 1931.

Barredo and Taylor, "The Electrochemical Society," Preprint 92–96, October 15–18, 1947, pages 303–310.

Robinson, "The Electrochemical Society," Preprint 92–38, October 15–18, 1947, pages 503–522.

Hickman et al., "Ind. and Eng. Chem. Anal. Ed., vol. 5, 1933, pages 65–68.

Shenk et al., "Ind. and Eng. Chem. Anal. Ed.," vol. 7, 1935, pages 194–197.